(12) United States Patent
LeTourneau

(10) Patent No.: US 7,720,807 B1
(45) Date of Patent: May 18, 2010

(54) REPRESENTING FINITE NODE-LABELED TREES USING A ONE BIT ENCODING

(75) Inventor: Jack J. LeTourneau, Ojai, CA (US)

(73) Assignee: Square Zero, Inc., New York, NY (US)

( * ) Notice: Subject to any disclaimer, the term of this patent is extended or adjusted under 35 U.S.C. 154(b) by 297 days.

(21) Appl. No.: 12/015,959

(22) Filed: Jan. 17, 2008

Related U.S. Application Data

(60) Provisional application No. 60/885,399, filed on Jan. 17, 2007, provisional application No. 60/885,313, filed on Jan. 17, 2007.

(51) Int. Cl.
    *G06F 17/30* (2006.01)
(52) U.S. Cl. .................................. 707/602; 707/756
(58) Field of Classification Search .............. 707/100, 707/101
    See application file for complete search history.

(56) References Cited

U.S. PATENT DOCUMENTS

| | | | | |
|---|---|---|---|---|
| 4,417,305 A | * | 11/1983 | Berstis | ......................... 712/223 |
| 5,724,576 A | | 3/1998 | LeTourneau | |
| 5,758,152 A | * | 5/1998 | LeTourneau | ................. 707/102 |
| 5,787,432 A | | 7/1998 | LeTourneau | |
| 6,055,537 A | | 4/2000 | LeTourneau | |
| 7,596,552 B2 | * | 9/2009 | Levy et al. | ...................... 707/3 |
| 2005/0187900 A1 | | 8/2005 | LeTourneau | |
| 2005/0267908 A1 | | 12/2005 | LeTourneau | |
| 2006/0015538 A1 | | 1/2006 | LeTourneau | |
| 2006/0095442 A1 | | 5/2006 | LeTourneau | |
| 2006/0095455 A1 | | 5/2006 | LeTourneau | |
| 2006/0123029 A1 | | 6/2006 | LeTourneau | |
| 2006/0129582 A1 | | 6/2006 | Schiffmann et al. | |
| 2006/0259533 A1 | | 11/2006 | LeTourneau | |
| 2006/0271573 A1 | | 11/2006 | LeTourneau | |

OTHER PUBLICATIONS

N. Immerman, "Descriptive Complexity," Texts in Computer Science (1999), p. 181-82.
LeTourneau, J.J, "Multiplicative Numerals and the Elementary Theory of Finite Multisets," Feb. 21, 1992.

\* cited by examiner

*Primary Examiner*—John E Breene
*Assistant Examiner*—Thu-Nguyet Le
(74) *Attorney, Agent, or Firm*—Carr & Ferrell LLP

(57) ABSTRACT

Ease of processing and exchange of information and data between different programmatic schema and memory stores is described. A common indexing system or coordination language based on the natural number node-labeled tree data structure provides a common programming element for use at the base of all container-oriented manipulation.

22 Claims, 1 Drawing Sheet

| INDEX | POSITIVE BINARY STRINGS | NODE-LABELED FINITE TREES | | |
|---|---|---|---|---|
| | | Natural Number String Notation | { (, ), 0, 1 } - String Notation | { b, c, S, + } - Term Notation |
| 0 | < > | ( ) | ( ) | b |
| 1 | <1> | (0) | (0) | c |
| 2 | <11> | (1) | (1) | S(b) |
| 3 | <111> | (0 (0 )) | (0 (0 )) | S(c) |
| 4 | <101> | (2) | (10) | (S(b)+S(b)) |
| 5 | <1111> | (0 (1 )) | (0 (1 )) | S(S(b)) |
| 6 | <1011> | (1 (0 )) | (1 (0 )) | (S(b)+S(c)) |
| 7 | <11111> | (0 (0 (0 ))) | (0 (0 (0 ))) | S(S(c)) |
| 8 | <10101> | (3) | (11) | (S(b)+((S(b)+S(b)))) |
| 9 | <110011> | (0 (0 )(0 )) | (0 (0 )(0 )) | (S(c)+S(c)) |
| 10 | <10111> | (1 (1 )) | (1 (1 )) | (S(b)+S(S(c))) |
| 11 | <1101> | (0 (2 )) | (0 (10 )) | S((S(b)+S(b))) |
| 12 | <101011> | (2 (0 )) | (10 (0 )) | (S(c)+(S(b)+S(b))) |
| 13 | <111111> | (0 (0 (1 ))) | (0 (0 (1 ))) | S(S(S(b))) |
| 14 | <101111> | (1 (0 (0 ))) | (1 (0 (0 ))) | (S(b)+S(S(c))) |
| 15 | <1100111> | (0 (0 )(1 )) | (0 (0 )(1 )) | (S(c)+S(S(b))) |
| 16 | <1010101> | (4) | (100) | (S(b)+(S(b)+((S(b)+S(b))))) |
| 17 | <11011> | (0 (1 (0 ))) | (0 (1 (0 ))) | S((S(b)+S(c))) |
| 18 | <10110011> | (1 (0 )(0 )) | (1 (0 )(0 )) | (S(b)+(S(c)+S(c)) |
| 19 | <1111111> | (0 (0 (0 (0 ))) | (0 (0 (0 (0 ))) | S(S(S(c))) |
| 20 | <1010111> | (2 ( 1 )) | (10 ( 1 )) | (S(b)+S(b)+S(S(c)))) |
| 21 | <11001111> | (0 (0 )(0 (0 ))) | (0 (0 )(0 (0 ))) | (S(c)+S(S(c))) |
| 22 | <101101> | (1(2)) | (1(10)) | (S(b)+S((S(b)+S(b)))) |
| 23 | <110101> | (0 (3 )) | (0 (11 )) | S((S(b)+((S(b)+S(b))))) |
| 24 | <10101011> | (3 (0 )) | (11 (0 )) | (S(b)+(S(b)+(S(b)+S(c)))) |
| 25 | <111000111> | (0 (1 )(1 )) | (0 (1 )(1 )) | (S(S(b))+ S(S(b))) |

Rows 1 to 25    138 bits            360 bits          300 bits

| INDEX | POSITIVE BINARY STRINGS | NODE-LABELED FINITE TREES | | |
|---|---|---|---|---|
| | | Natural Number String Notation | $\{\,(,\,),\,0,\,1\,\}$- String Notation | $\{\,b,\,c,\,S,\,+\,\}$- Term Notation |
| 0 | < > | ( ) | ( ) | b |
| 1 | <1> | (0) | (0) | c |
| 2 | <11> | (1) | (1) | S(b) |
| 3 | <111> | (0 (0 )) | (0 (0 )) | S(c) |
| 4 | <101> | (2) | (10) | (S(b)+S(b)) |
| 5 | <1111> | (0 (1 )) | (0 (1 )) | S(S(b)) |
| 6 | <1011> | (1 (0 )) | (1 (0 )) | (S(b)+S(c)) |
| 7 | <11111> | (0 (0 (0 ))) | (0 (0 (0 ))) | S(S(c)) |
| 8 | <10101> | (3) | (11) | (S(b)+((S(b)+S(b)))) |
| 9 | <110011> | (0 (0 )(0 )) | (0 (0 )(0 )) | (S(c)+S(c)) |
| 10 | <10111> | (1 (1 )) | (1 (1 )) | (S(b)+S(S(c))) |
| 11 | <1101> | (0 (2 )) | (0 (10 )) | S((S(b)+S(b))) |
| 12 | <101011> | (2 (0 )) | (10 (0 )) | (S(c)+(S(b)+S(b))) |
| 13 | <111111> | (0 (0 (1 ))) | (0 (0 (1 ))) | S(S(S(b))) |
| 14 | <101111> | (1 (0 (0 ))) | (1 (0 (0 ))) | (S(b)+S(S(c))) |
| 15 | <1100111> | (0 (0 )(1 )) | (0 (0 )(1 )) | (S(c)+S(S(b))) |
| 16 | <1010101> | (4) | (100) | (S(b)+(S(b)+((S(b)+S(b))))) |
| 17 | <11011> | (0 (1 (0 ))) | (0 (1 (0 ))) | S((S(b)+S(c))) |
| 18 | <10110011> | (1 (0 )(0 )) | (1 (0 )(0 )) | (S(b)+(S(c)+S(c))) |
| 19 | <1111111> | (0 (0 (0 (0 )))) | (0 (0 (0 (0 )))) | S(S(S(c))) |
| 20 | <1010111> | (2 ( 1 )) | (10 ( 1 )) | (S(b)+S(b)+S(S(c)))) |
| 21 | <11001111> | (0 (0 )(0 (0 ))) | (0 (0 )(0 (0 ))) | (S(c)+S(S(c))) |
| 22 | <101101> | (1(2)) | (1(10)) | (S(b)+S((S(b)+S(b)))) |
| 23 | <110101> | (0 (3 )) | (0 (11 )) | S((S(b)+((S(b)+S(b))))) |
| 24 | <10101011> | (3 (0 )) | (11 (0 )) | (S(b)+(S(b)+(S(b)+S(c)))) |
| 25 | <111000111> | (0 (1 )(1 )) | (0 (1 )(1 )) | (S(S(b))+ S(S(b))) |
| Rows 1 to 25 | 138 bits | | 360 bits | 300 bits |

FIGURE 1

REPRESENTING FINITE NODE-LABELED TREES USING A ONE BIT ENCODING

CROSS-REFERENCE TO RELATED APPLICATIONS

The present application claims the priority benefit of U.S. provisional patent application No. 60/885,399 filed Jan. 17, 2007 and U.S. provisional patent application No. 60/885,313 filed Jan. 17, 2007, the disclosure of each application is incorporated by reference.

BACKGROUND OF THE INVENTION

1. Field of the Invention

The present invention generally relates to information technology. More specifically, the present invention relates to querying, processing, and exchanging data using different data stores, applications, and processors.

2. Description of the Related Art

Computers have made dramatic advances in their ability to store, process, and communicate information. This rapid advancement in computer science is, in large part, a credit to breakthroughs in chip design, software programming, and networking technologies. Notwithstanding these advances, there is a continued—and increasing—need for the storage of more data in less space and the processing of more information in less time and with increased accuracy. The ability to process information within a computer system (including the storage and transmission of that information) is largely governed by two factors: processor speed and the number of logical or computational steps required for the processing of that information (or any particular segment thereof). While clock speeds of processors continue to increase, the number of processing steps required to accomplish certain natural tasks is logically determined and often with stringent limitations.

Computer programming involves manipulating data structures and their component data using algorithmic instructions written in languages utilizing precise and pre-defined processing rules. Certain processes are fundamental yet inherently complex. With respect to these processes, no amount of ingenuity can reduce the associated complexity or number of steps beyond a certain threshold. In this regard, computational complexity in the 21st century may be analogized to the 19th century's physical problem of friction with the dawn of the machine age where physical scientists had to learn how to reduce or disperse friction in order to move objects efficiently. Similar understandings and planning are now necessary to minimize the computational complexity associated with constructing and managing data.

Until recently, there has been no known data structure that could be used as a base for other container data structures. In particular there was no binary representation for the node-labeled tree data type. The node-labeled tree data type is a data type of increasing importance as interactions with the likes of the World Wide Web continue to grow. For example, the Extensible Markup Language (XML) standard has become an increasingly popular language based on the node-labeled tree data type since presentation of the World Wide Web Consortium specification (XML 1.0) in 1998.

Notwithstanding the growing popularity of XML, there has been (and remains) a continued drive to construct separate programming languages that are designed to fit naturally into different cognitive application areas. The Structured Query Language (SQL) developed by International Business Machines in the 1970s is an example of a programming language for relational databases, finite tables, and two dimensional sequences. C, developed in 1972 by Bell Telephone Laboratories for the Unix operating system, is a general-purpose, block structured, procedural, imperative computer programming language that handles strings and one dimensional sequences. Prolog is a further example of a logic programming language developed in the 1970s and associated with user interfaces and artificial intelligence applications and otherwise capable of handling finite sets and trees.

Multiple languages frustrate processing and interchange of information. Differences in data type and associated programming language create bottlenecks in the exchange and analysis of data and information derived from the same. There is a need for a processing model that allows for ease of processing and interchange of information between various data stores utilizing disparate data types and programming languages. As eighty percent of data is semi-structured and heaps, strings, and trees are the fundamental atomic data structures of this semi-structured data, there is a need for a single underlying data index system or coordination language that could represent and coordinate programming activity between and within different data types.

SUMMARY OF THE INVENTION

Embodiments of the presently claimed invention provide for ease of processing and exchange of information and data between different programmatic schema and memory stores. Such embodiments provide for a common indexing system or coordination language based on the natural number node-labeled tree data structure. This system and coordination language provide for a common programming element for use at the base of all container-oriented manipulation.

To ensure compatibility with the rest of the binary world, embodiments of this index or coordination structure may be definable using just two symbols. New language elements may thus be described as a true one bit or binary encoding. This coordination structure is also algebraic in nature thereby allowing for the combining of objects that the coordination language itself may create using its own internal methods. Embodiments of the present invention may also be arithmetically universal in that both addition and multiplication are elementarily definable within the system. These and other embodiments may support the manipulation of certain fragments of monadic or weak monadic second-order logic.

BRIEF DESCRIPTION OF THE DRAWING

FIG. 1 illustrates the first twenty six finite node-labeled trees, represented by both their {0, 1, (,)}-string and their {b, c, S, +}-term notations, and for each node-labeled tree, the associated positive binary string in accordance with an embodiment of the present invention.

DETAILED DESCRIPTION

The presently disclosed invention allows applications to utilize optimal set or tree data structures for their own individual needs with each view constructed from a common base. A universal exchange standard may in this way be created for container data representation and that results in more efficient information processing environments allowing for new forms of analytic decision-support applications and new kinds of data translation/integration.

Objects of interest are generally subject to some sort of indexing or nomenclature; for example: $object_0$, $object_1$, and $object_2$. Users of those objects become interested in the primitive kinds of collections that can be constructed from these indexed or named objects. The simplest and most commonly used of these collection data structures are heaps (of objects), strings (of objects) and trees (of objects). Each of these labeled data types, with their natural operations, is a reflection or image of the single more fundamental data type described here.

The present application adopts the standard strings-oriented technique for representing or naming finite natural number node-labeled rooted unordered trees using well-formed parenthesis with the labels written on the inside of any left parenthesis is adopted. The present application also assumes the traditional four letter alphabet: {0, 1, (,)}.

The four line logic program below asserts or creates, as its core or compiler constructed model, the free commutative monoid with zero. This logic program, seen as a set of rewrite rules, defines as its congruence model on the set of all {b, c, S, +}-terms, an isomorphic copy of the node-labeled finite trees—including the empty tree—under the tree operations of pushing a tree down from its root while adding a new root labeled zero (denoted by the symbol "S") and the binary merger at the root operation (denoted by the symbol "+").

(x+b)=b;
(x+c)=x;
(x+y)=(y+x);
((x+y)+z)=(x+(y+z)).

Of the four symbols named by the signature or similarity type of the node-labeled trees equations, the monadic operation symbol S is not used with in the equations. For this reason, the operation corresponding to the symbol S is called a free or unrestricted.

For each natural number node-labeled finite rooted unordered tree, a unique binary string is defined that acts as a structured hash or name for its tree. This definition relies on the following notation:

0 is the natural number zero and 1 is the natural number one;

NN={0, 1, 2, 3, ... } is the set of all natural numbers;

+ is the binary operation defined on the natural numbers of ordinary addition;

* is the binary operation defined on the natural numbers of ordinary multiplication;

< > is the empty string;

<0> is the binary string consisting of 0 alone;

<1> is the binary strings consisting of 1 alone;

{0, 1}*={< >, <0>, <1>, <00>, ... } is the set of all finite binary strings over 0 and 1; and _ is the binary operation defined on the binary strings of concatenation.

A binary string is a positive binary string if and only if that string does not begin or end with 0 and such that no initial substring of the string contains more 0-characters than 1-characters. If a positive binary string has no character 0, it is called an ordinal string. If s is a binary string that uses just one character then the string $s_{minus}$ is the string that results from s by dropping the last symbol of s and the string $s_{plus}$ is the string that results from s by adding one more symbol of the same kind as the symbols in s to the end of s. If s is a positive binary string, then pad(s) is the string of all 0 characters whose length is the number of 1s in string s minus number of 0s in string s; it follows that pad(< >)=< >.

The tree to sting translation or hash function, f(x), is the monadic function defined on the set of all finite natural number node-labeled rooted unordered trees whose range is the set of all positive binary strings. The function f(x) is one-to-one and establishes a structural link between the tree and the strings. The program below describes the tree to string hashing claimed as subject matter in this application. In this program, let x and y be any finite natural number node labeled rooted unordered trees.

f(( ))=< >;
((0))=<1>;
f((1))=(<11>);
f((_0_x_))=(<1>_f(x)), f(x) is not an ordinal string;
f((_0_x_))=(<11>_f(x)), f(x) is an ordinal string;
f(x+y)=((f(x)_padf(x))_f(y)), f(y) is not an ordinal string;
f(x+y)=((f(x)_padf(A))_f(y)$_{minus}$), f(x) is not and f(y) is an ordinal string;
f(x+y)=((f(x)$_{minus}$padf(x)$_{minus}$)_f(y)$_{minus}$), f(x) and f(y) are ordinal strings.

FIG. 1 illustrates the first twenty-six node-labeled trees, represented by both their {0, 1, (,)}-string and {b, c, S, +}-term notations (in columns two and three, respectively), and for each node-labeled tree, the associated positive binary string as defined by the above (as reflected in the first column).

The trees in FIG. 1 are enumerated, for ease of illustration, in the node-labeled tree order using the positive natural numbers as an index. More precisely, the $k^{th}$ node-labeled tree stores within its root node the number of times 2 divides into k. The daughters of root in the tree that corresponds to k each correspond to the indexes of the odd prime divisors of k. This enumeration of the trees is discussed in "An Arithmetic of Data and Hierarchical Structure" by J. J. LeTourneau (1987), the disclosure of which is incorporated herein by reference.

The function or hash f(x) matches the node-labeled trees (NLT) and the positive binary strings (PBS) in a 1-1 fashion and this association is independent of any particular tree enumeration or binary string enumeration.

Each positive binary string s represents not only a particular finite natural number node-labeled rooted unordered tree but also the un-labeled tree obtained from the string by concatenating on the right the pad of the string. In addition, each positive binary string also represents a single natural number. That number also turns out to be the index of the node-labeled tree that corresponds to the string. The code that effects this translation is as follows:

Begin with a positive binary string s and convert s to a Polish prefix formula as follows:

Concatenate (Pad(s)_0) on to the right end of s;

Convert all occurrences of the symbol "1" in s to the binary operation symbol "#";

Convert all occurrences of the symbol "0" in s to the constant symbol "c";

Evaluate the resulting string as a Polish prefix {c, #}-term using the rules below.

Eval(c)=0;
Eval(#cc)=1;
Eval(#xc)=q(Eval(x$_{minus}$)), x an ordinal string;
Eval(#xc)=q(Eval(x)), x not an ordinal sting;
Eval(#xy)=(q(Eval(x))*Eval(y$_{plus}$)), y is not c and y is an ordinal string;
Eval(#xy)=(q(Eval(x))*Eval(y)), y is not c and y is not an ordinal string.

Since each node-labeled tree may be represented by a positive binary string, the techniques described above can affect a cost saving in the number of bits used to represent node-labeled trees. For example, it requires 360 bits to represent the node-labeled trees 1-25 using the standard lisp like parenthesis notation as illustrated in FIG. 1. The same information requires only 138 bits when these same trees are stored as positive binary strings. Positive binary strings use approximately one half of the bits required to name the node-labeled tree when compared to the standard four character string notation.

Many operations involving node-labeled trees can, without loss of generality, be replaced by operations defined on the associated logical compressions. From the definition of the NLT to PBS translation itself, it follows that the operations of Push and Merge on node-labeled trees are easily definable using positive binary strings. All recursively enumerable operations are thus definable using positive binary strings and their natural operations.

Positive binary strings are easily defined and efficiently manipulated in that they are smaller than their corresponding trees and the key operation being string concatenation. PBS strings are, however, unbounded in length notwithstanding the bounded environment of computer science (e.g., 32 bit, 64 bit, 128 bit, and so forth). It is envisioned that through the use of the techniques described herein that the work memory may incur managing large strings can be effectively 'traded off' with respect to the savings effectuated as a result of efficient representation and minimal operators.

Finite node-labeled trees as described herein may be transmitted in a communications network utilizing just two symbols. In such an instance:

$T = <T_0, T_1, \ldots, T_k>$ is any finite sequence of labeled trees; and $<PBS_0, PBS_1, \ldots PBS_k>$ is the corresponding sequence of positive binary strings.

To transmit the sequence T over a communications network, only the sequence of 0 and 1 derived from the PBS sequence with each entry separated by the O-character acting as a comma need be transmitted. The difference between the 0s on the inside of a positive binary sequence and the 0-characters that act as commas is distinguished using the standard well formed one-way read tests. Characters may be transmitted (and subsequently 'read') counting the number of 1s and 0s. When the 1s and 0s balance, the end of a positive binary string has been reached and the next zero acts as a comma. Multiple commas are allowed. For example:

$<PBS_0\_0\_PBS_1\_0\_0\_0\_PBS_2\_0\_PBS_3\_0\_\ldots\_PBS_k>$.

The methods and processes disclosed herein are envisioned to have applicability in a wide variety of industries. For example, with respect to the computing arts, the present methods and processes may be implemented in the context of a search application (e.g., an indexer or search engine). In such an application, the presently-described string-to-numeral translation may increase search efficiency including minimizing time to search, cycles required to effectuate a search, and the scope of information that may be searched. With respect to the aforementioned cycle efficiencies, implementing the presently disclosed methods and processes in a parallel processing environment may allow for increases in clock speed.

Similar benefits may be enjoyed with respect to databases including increased storage efficiency. String-to-number translations may also allow for the translation of one database to another database. Benefits as they pertain to transmission may also be realized. For example, characters may be transmitted utilizing only two symbols. These transmissions may be stream-based whereby the transmission may be split, added to, partitioned, or otherwise modulated. Numerous middleware applications may enjoy the benefits of the methodologies described herein with respect to translations allowing communication and interaction between applications.

A computing device implementing the methods described herein may include an interface (a network interface and/or an interface to a data source). That interface may receive a first set of information, which may include a binary string. Through the execution of instructions by a processor, the instructions being stored in memory that may also stored the aforementioned first set of information, the first information may be converted into a second set of information, which may subsequently be stored in memory. That second set of information may consist of only two symbols as has been described herein.

Various software applications may embody the translation methodologies described herein. Such applications may be stored on a computer-readable storage medium that is executable by a processor for perform said methodologies. Such media are inclusive of memory devices such as hard drives, flash cards, USB drives, and so forth. These media also include floppy disks and optical disks such as CD-ROM and DVD.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method for effectuating a string-to-numeral translation (eval), the method comprising:
   receiving a binary string s, the binary string s comprising one or more characters; and
   executing instructions stored in memory, wherein execution of the instructions by a processor converts s to an algebraic term,
      wherein the algebraic term is a Polish prefix term where the symbol "c" represents a constant symbol and the symbol "#" represents a binary operation symbol,
      wherein the symbols "x" and "y" each represents any finite natural number node labeled rooted unordered trees,
      wherein the Polish prefix formula includes:
         concatenating (Pad(s)_0) on to the right end of s,
         converting all occurrences of the symbol "1" in s to the binary operation symbol "#",
         converting all occurrences of the symbol "0" in s to the constant symbol "c", and
      wherein evaluating the resulting string includes:
         eval(c)=0,
         eval(#cc)=1,
         eval(#xc)=q(Eval($x_{minus}$)), wherein x is an ordinal string,
         eval(#xc)=q(Eval(x)), wherein x is not an ordinal string,
         eval(#xy)=(q(Eval(x))*Eval($y_{plus}$)), wherein y is an ordinal string,
         eval(#xy)=(q(Eval(x))*Eval(y), wherein y is not an ordinal string,
      wherein q is a monadic operation defined on natural numbers that lists in order the prime natural numbers.

2. The method of claim 1, wherein the binary string does not begin or end with "0."

3. The method of claim 2, wherein no initial substring of the binary string contains more "0" than "1" characters.

4. The method of claim 3, wherein the binary string has no "0" characters.

5. The method of claim 1, wherein the monadic evaluation function Eval( ) uses a stored table of ordinal prime values wherein evaluating the string $s_{pins}$.

6. The method of claim 5, wherein the evaluation function Eval( ) uses a table of ordinal prime values.

7. The method of claim 3, wherein the pad(s) consisting of the string of all "0" characters whose length is the number of "1" characters minus the number of "0" characters I concatenated t to the right hand side of s.

8. The method of claim 1, further comprising implementing the translation in a search application, wherein the translation increases search engine efficiency.

9. The method of claim 1, further comprising implementing the transaction in parallel processing, wherein the translation increases a clock speed.

10. The method of claim 1, further comprising implementing the translation in a database.

11. The method of claim 10, further comprising implementing the translation in a database.

12. The method of claim 10, wherein the translation allows for translation from the database to a second database.

13. The method of claim 1, wherein the sequence $T=T_0, T_1, \ldots, T_k>$ of finite natural number node-labeled rooted unordered labeled trees creates the sequence $<PBS_0, PBS_1, \ldots PBS_k>$ of positive binary strings that corresponds to the numerals which correspond to the respective tree.

14. The method of claim 13, wherein each entry is separated by the 0-character acting as s comma.

15. The method of claim 14, wherein characters may be read by counting the number of "0" characters and "1" characters.

16. The method of claim 15, wherein the characters may be transmitted utilizing only two symbols.

17. The method of claim 16, wherein the transmission is a stream-based transmission.

18. The method of claim 17, further comprising splitting, adding, partitioning, or modulating the stream-based transmission.

19. The method of claim 1, further comprising implementing the translation in a middleware application, wherein the translation allows a first application to interact with a second application.

20. A computer-readable storage medium having embodied thereon a program, the program being executable by a processor perform a method for effectuating a string to numeral translation, the method comprising:
receiving a binary string s, the binary string s comprising one or more characters;
converting s to a Polish prefix formula, where the symbol "c" represents a constant symbol and the symbol "#" represents a binary operation symbol,
wherein the symbols "x" and "y" each represents any finite natural number node labeled rooted unordered trees, and
wherein the Polish prefix formula includes:
concatenating (Pad(s)_0) on to the right end of s,
converting all occurrences of the symbol "1" in s to the binary operation symbol "#",
converting all occurrences of the symbol "0" in s to the constant symbol "c", and
evaluating the resulting string as a Polish prefix $\{c, \#\}$-term, wherein evaluating the resulting string includes:
eval(c)=0,
eval(#cc)=1,
eval(#xc)=q(Eval($x_{minus}$)), wherein x is an ordinal string,
eval(#xc)=q(Eval(x)), wherein x is not an ordinal string,
eval(#xy)=(q(Eval(x))*Eval($y_{plus}$)), wherein y is an ordinal string,
eval(#xy)=(q(Eval(x))*Eval(y), wherein y is not an ordinal string, wherein q is a monadic operation defined on natural numbers that lists in order the prime natural numbers, and
converting a tree to a node-labeled standard.

21. A computing device, comprising:
an interface configured to receive a first set of information including a binary string s, the binary string s comprising one or more characters;
memory configured to stored the received first set of information; and
a processor configured to execute instructions stored in memory and to convert the first information stored in memory into a second set of information including an algebraic term, the processor further configured to store the second set of information in memory,
wherein the algebraic term is a Polish prefix term where the symbol "c" represents a constant symbol and the symbol "#" represents a binary operation symbol,
wherein the symbols "x" and "y" each represents any finite natural number node labeled rooted unordered trees,
wherein the Polish prefix formula includes:
concatenating (Pad(s)_0) on to the right end of s,
converting all occurrences of the symbol "1" in s to the binary operation symbol "#",
converting all occurrences of the symbol "0" in s to the constant symbol "c", and
wherein evaluating the resulting string includes:
eval(c)=0,
eval(#cc)=1,
eval(#xc)=q(Eval($x_{minus}$)), wherein x is an ordinal string,
eval(#xc)=q(Eval(x)), wherein x is not an ordinal string,
eval(#xy)=(q(Eval(x))*Eval($y_{plus}$)), wherein y is an ordinal string,
eval(#xy)=(q(Eval(x))*Eval(y), wherein y is not an ordinal string, wherein q is a monadic operation defined on natural numbers that lists in order the prime natural numbers.

22. The computing device of claim 21, wherein the second set of information consists of only two symbols.

* * * * *